(12) United States Patent
Chang

(10) Patent No.: US 9,849,605 B2
(45) Date of Patent: Dec. 26, 2017

(54) POWER MITER SAW HAVING A FENCE WITH ELEVATED PLATFORMS

(71) Applicant: Chin-Chin Chang, Taichung (TW)

(72) Inventor: Chin-Chin Chang, Taichung (TW)

(*) Notice: Subject to any disclaimer, the term of this patent is extended or adjusted under 35 U.S.C. 154(b) by 0 days.

(21) Appl. No.: 15/168,021

(22) Filed: May 28, 2016

(65) Prior Publication Data

US 2017/0341258 A1    Nov. 30, 2017

(51) Int. Cl.
*B23D 45/14*   (2006.01)
*B23D 47/02*   (2006.01)
*B27B 27/06*   (2006.01)
*B23D 45/04*   (2006.01)

(52) U.S. Cl.
CPC ............ *B27B 27/06* (2013.01); *B23D 45/044* (2013.01); *B23D 47/025* (2013.01)

(58) Field of Classification Search
CPC .. B23D 59/005; B23D 45/044; B23D 59/007; B23D 47/02; B23D 45/14; B27B 27/10; B27B 5/29; Y10T 83/7726; Y10T 83/7697; Y10T 83/606; B27G 19/02; B27G 19/04
USPC ..... 83/471.3, 477.1, 508.2, 471.2, 701, 635, 83/490, 581, 471, 522.15, 522.11, 522.22, 83/486, 486.1, 473, 478, 477, 165, 477.2
See application file for complete search history.

(56) References Cited

U.S. PATENT DOCUMENTS

| | | | | |
|---|---|---|---|---|
| 6,474,206 B1* | 11/2002 | Brunson | ............. | B23D 45/044 108/139 |
| 2006/0086225 A1* | 4/2006 | Xin | .......... | B27B 27/04 83/581 |
| 2009/0158904 A1* | 6/2009 | Chen | ............... | B23D 59/006 83/162 |
| 2011/0000352 A1* | 1/2011 | Shibata | ................ | B23D 45/048 83/471.2 |
| 2011/0167977 A1* | 7/2011 | Xu | .......... | B27B 27/08 83/471.2 |
| 2011/0314988 A1* | 12/2011 | Xu | ............ | B27B 5/29 83/471.3 |

* cited by examiner

*Primary Examiner* — Ghassem Alie

(57) ABSTRACT

A power miter saw includes a base assembly including a frame, cavities on a bottom of the frame, two supports at two sides of the frame respectively, and two parallel sliding rods passing through one support; a table assembly including a rotatable table mounted on the frame, a miter arm secured to the rotatable table, and a fence at an edge of the rotatable table and secured to the supports; and a saw blade and motor assembly. The fence includes a central curved top, two platforms at two ends of the central curved top respectively, two shoulders each at a joining portion of the curved top and the adjacent platform, and two aligned grooved members each extending outward from a position proximate the platform. The platforms are at an elevation greater than that of the miter arm.

9 Claims, 14 Drawing Sheets

POWER MITER SAW HAVING A FENCE WITH ELEVATED PLATFORMS

BACKGROUND OF THE INVENTION

1. Field of the Invention

The invention relates to power miter saws and more particularly to a power miter saw having a fence with elevated platforms so that an increased length of a workpiece can be cut in a single cutting operation when an end of the workpiece is placed on the platforms and held against adjacent shoulders.

2. Description of Related Art

U.S. Pat. No. 8,631,734 to Liu discloses a power miter saw characterized by comprising a table for receiving a workpiece; a saw blade and motor assembly operatively connected to the table, the assembly being for rotating a saw blade; a linear guide mechanism attached to the table and being for supporting the assembly and enabling movement of the assembly along a predetermined linear path either forward or rearward; the mechanism including at least two links connected by a hinge connection, wherein the hinge connection includes a fixed shaft for rotation with respect to a first one of the links, but wherein the shaft is able to rotate with respect to a second one of the links; and a glide movement controller operatively connected to the hinge connection, wherein the glide movement controller includes a controller body and fastening members for moving the controller body such that resistance upon the shaft is increased upon movement in a first direction and decreased upon movement in a second direction.

However, a cutting length of a workpiece is relatively short when the workpiece is placed on the miter arm and held against the fence of the '734 patent'.

Notwithstanding the prior art, the invention is neither taught nor rendered obvious thereby.

SUMMARY OF THE INVENTION

It is therefore one object of the invention to provide a power miter saw comprising a base assembly including a frame, a plurality of cavities on a bottom of the frame, two supports at two sides of the frame respectively, and two parallel sliding rods passing through one support; a table assembly including a rotatable table mounted on the frame, a miter arm secured to the table, and a fence at an edge of the table and secured to the supports; and a saw blade and motor assembly including an electric motor, a rotatable circular saw blade driven by the electric motor, a handle, and a mounting member secured to the table; wherein the fence includes a central curved top, two platforms at two ends of the central curved top respectively, two shoulders each at a joining portion of the central curved top and the adjacent platform, and two aligned grooved members each extending outward from a position proximate the platform; and wherein the platforms are at an elevation greater than that of the miter arm.

The above and other objects, features and advantages of the invention will become apparent from the following detailed description taken with the accompanying drawings.

DETAILED DESCRIPTION OF THE INVENTION

Figure 1:
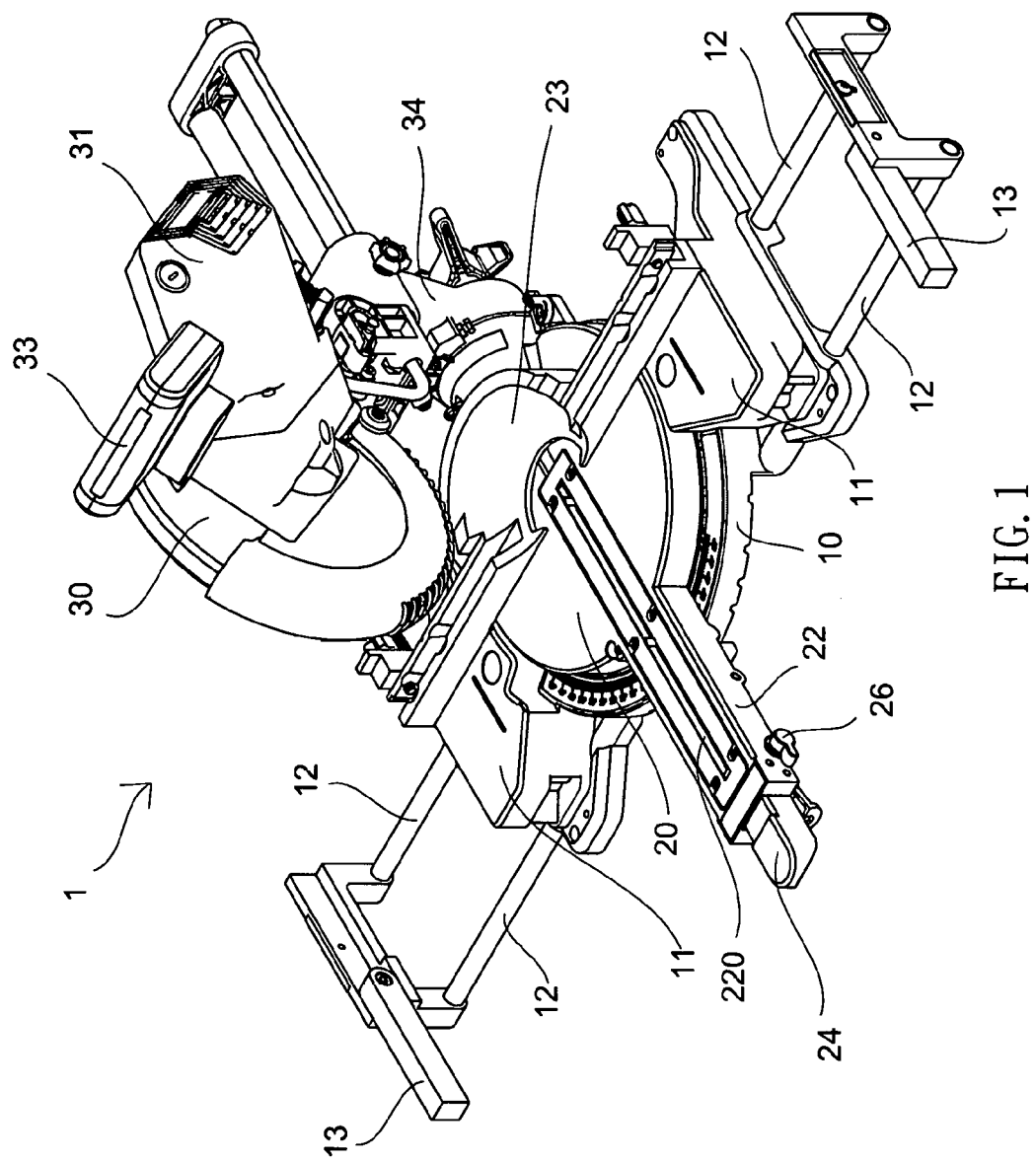
FIG. 1 is a perspective view of a power miter saw according to the invention.
Figure 2:
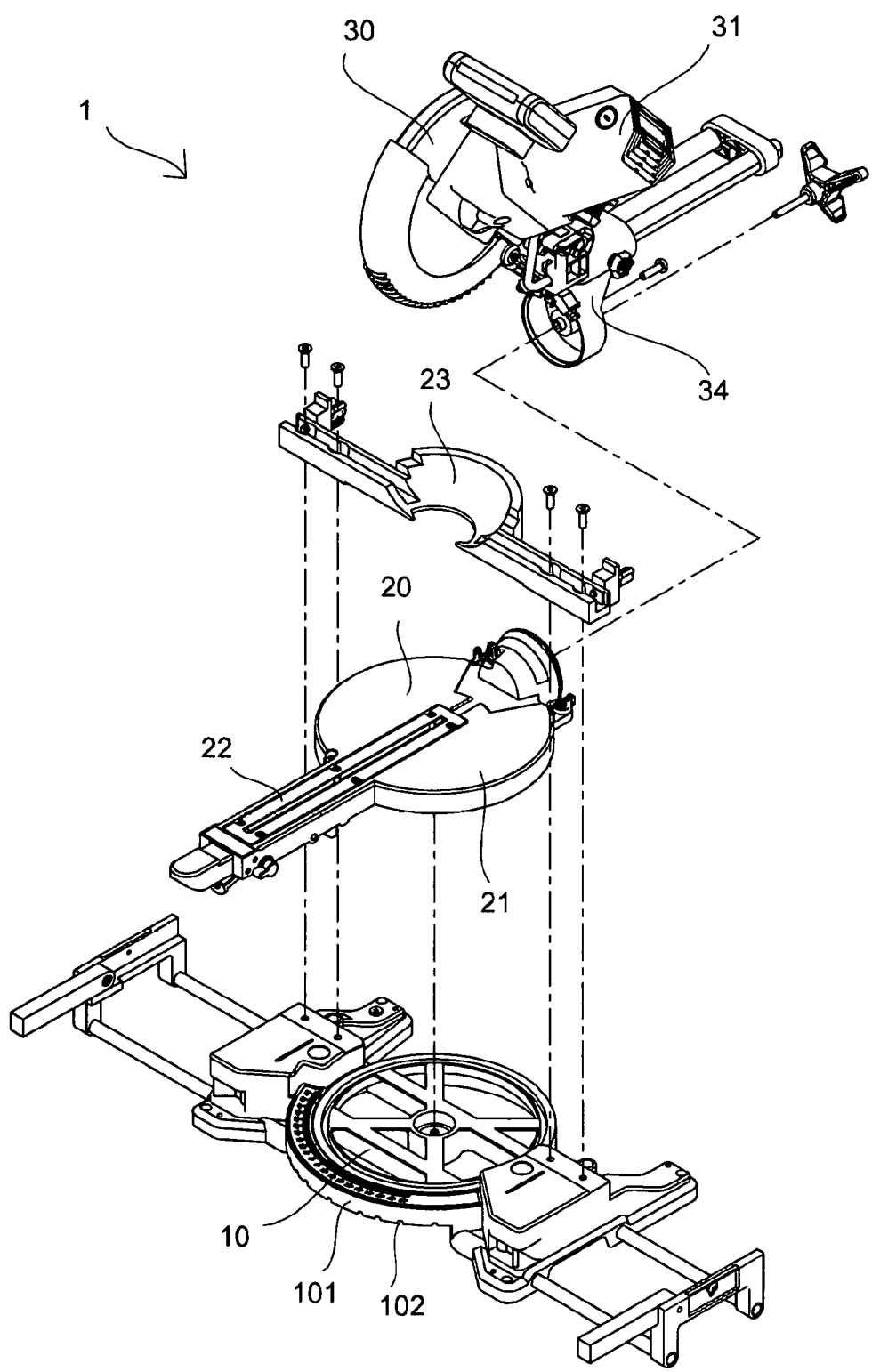
FIG. 2 is an exploded view of the power miter saw.
Figure 2A:
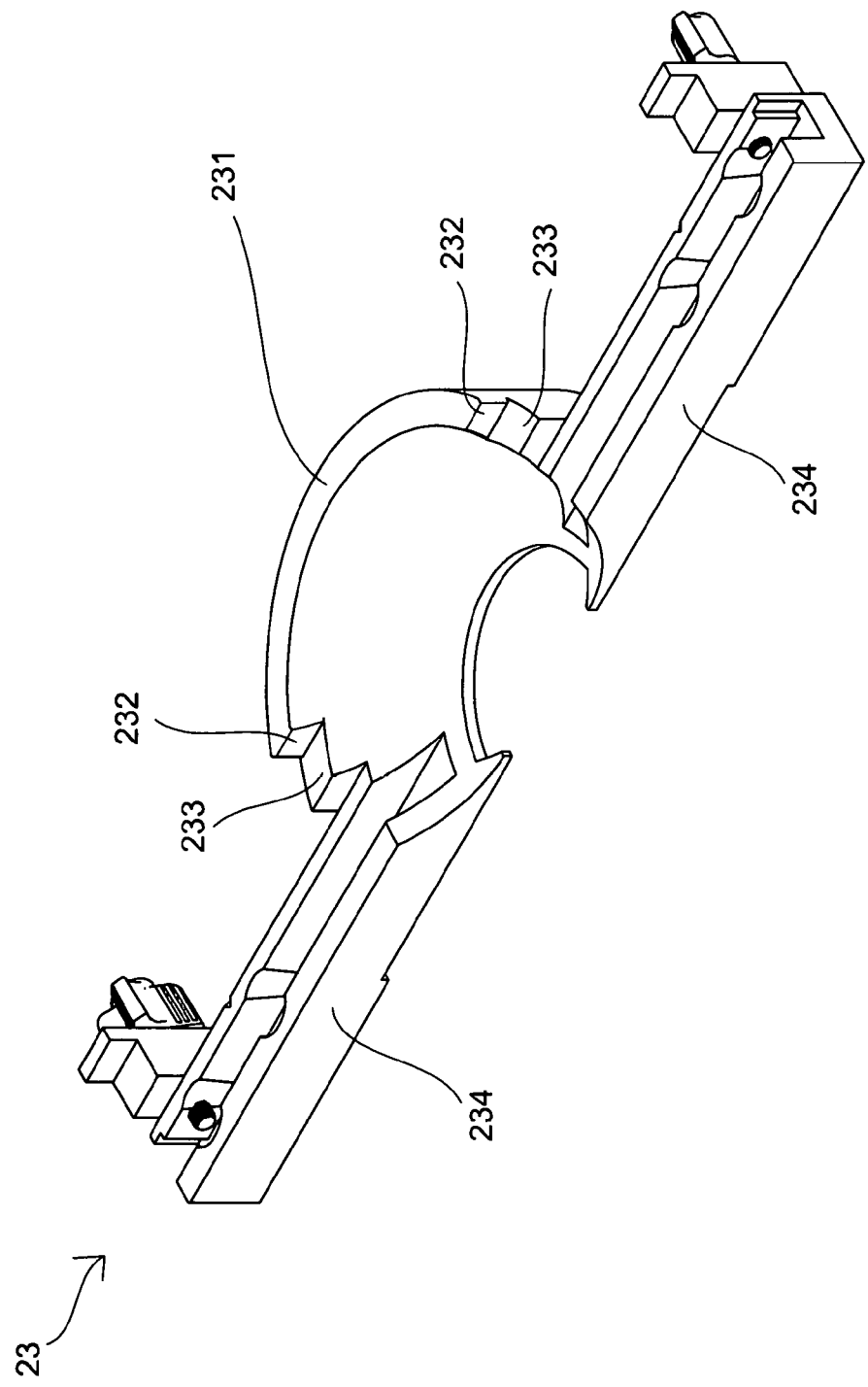
FIG. 2A is a perspective view of the fence.
Figure 3:
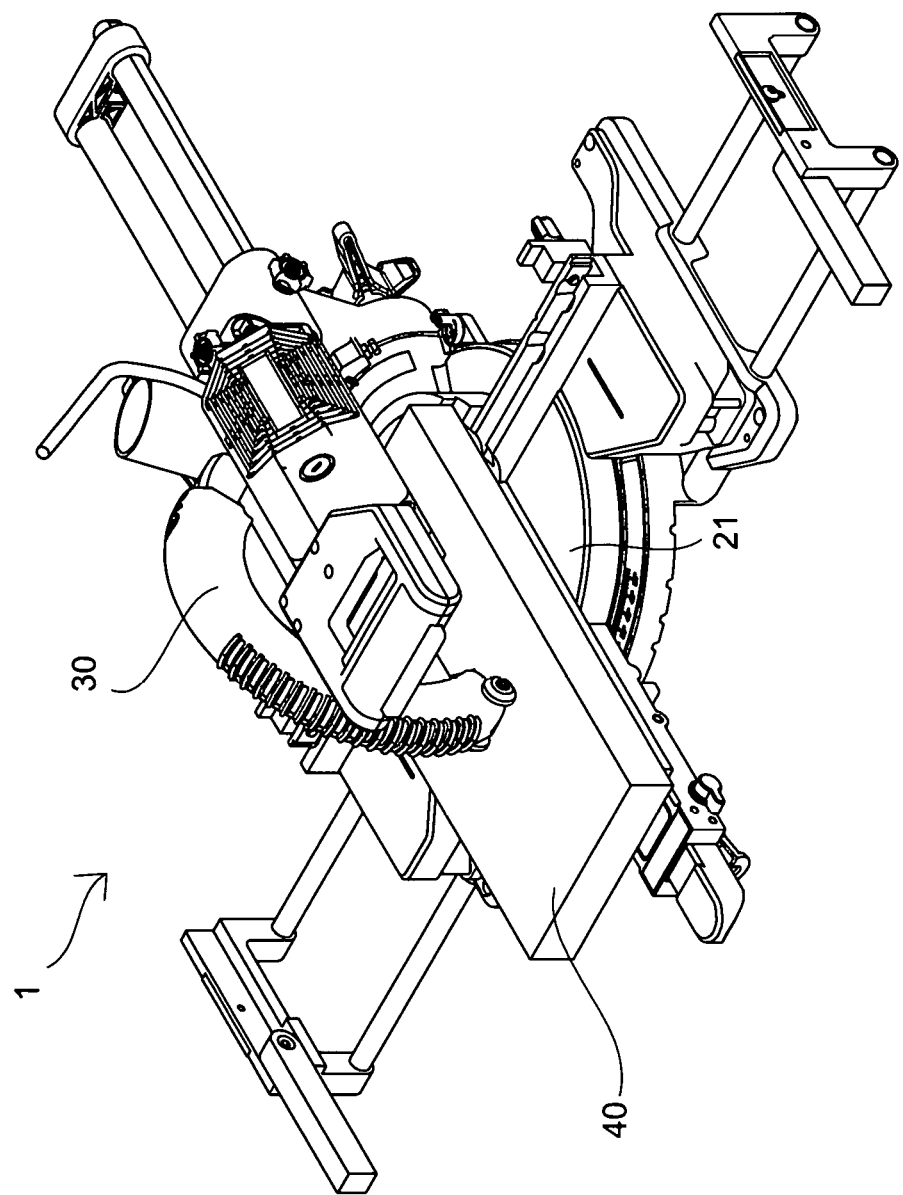
FIG. 3 is a view similar to FIG. 1 showing a workpiece held against the fence in a ready to cut position.
Figure 4:
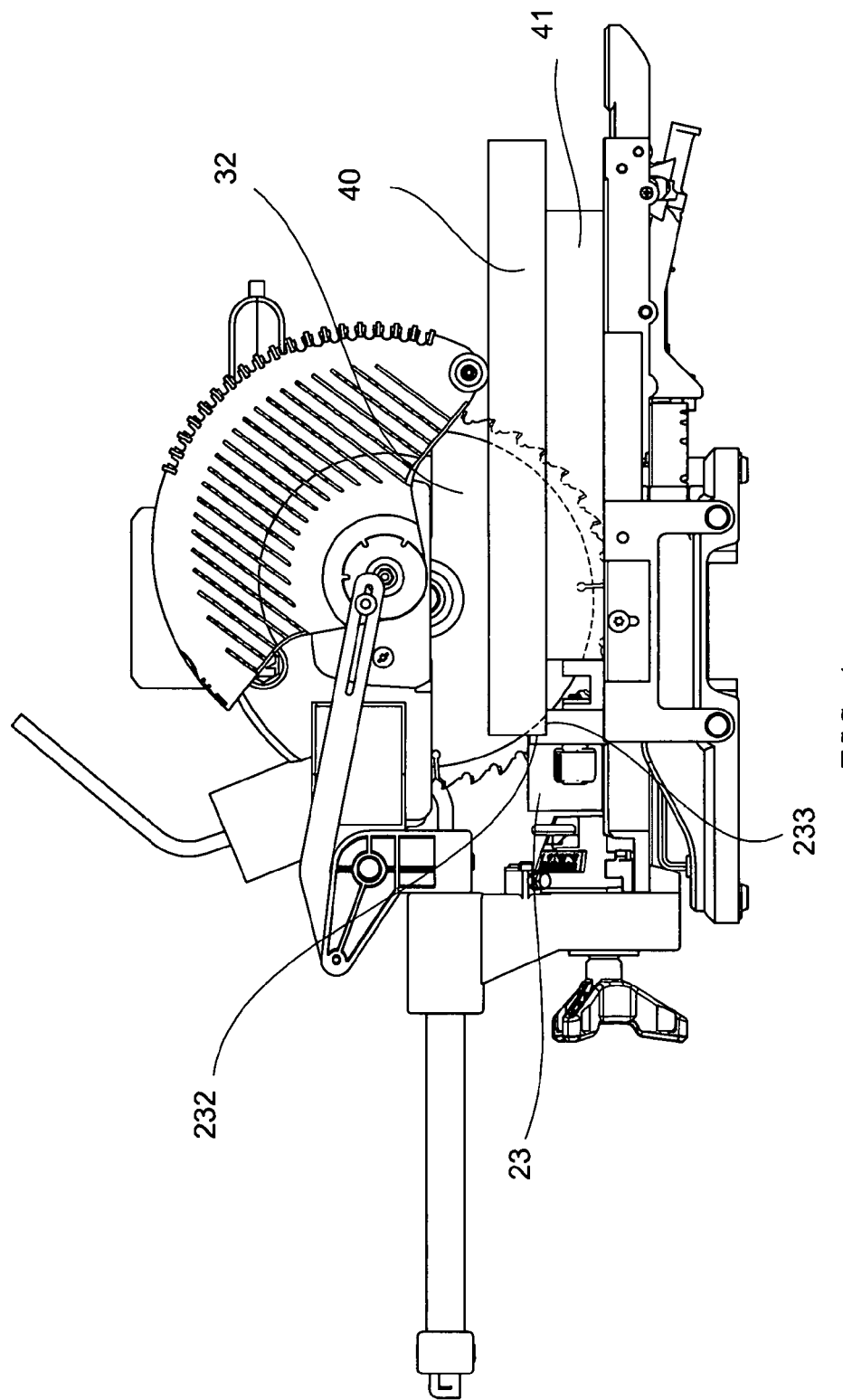
FIG. 4 is a side elevation of FIG. 3.
Figure 5:
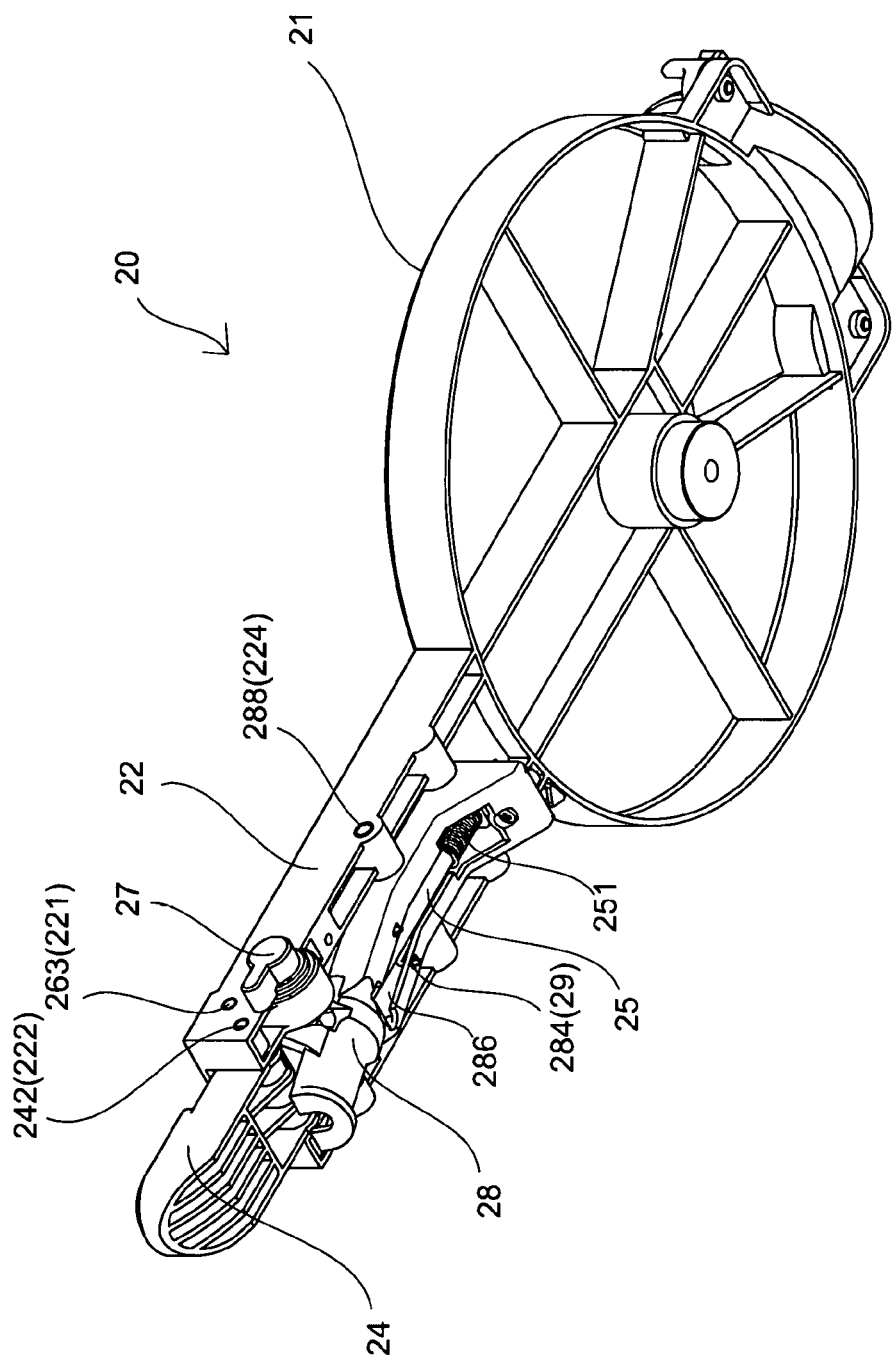
FIG. 5 is a perspective view of the table assembly including the table, the miter arm and the lever.
Figure 5A:
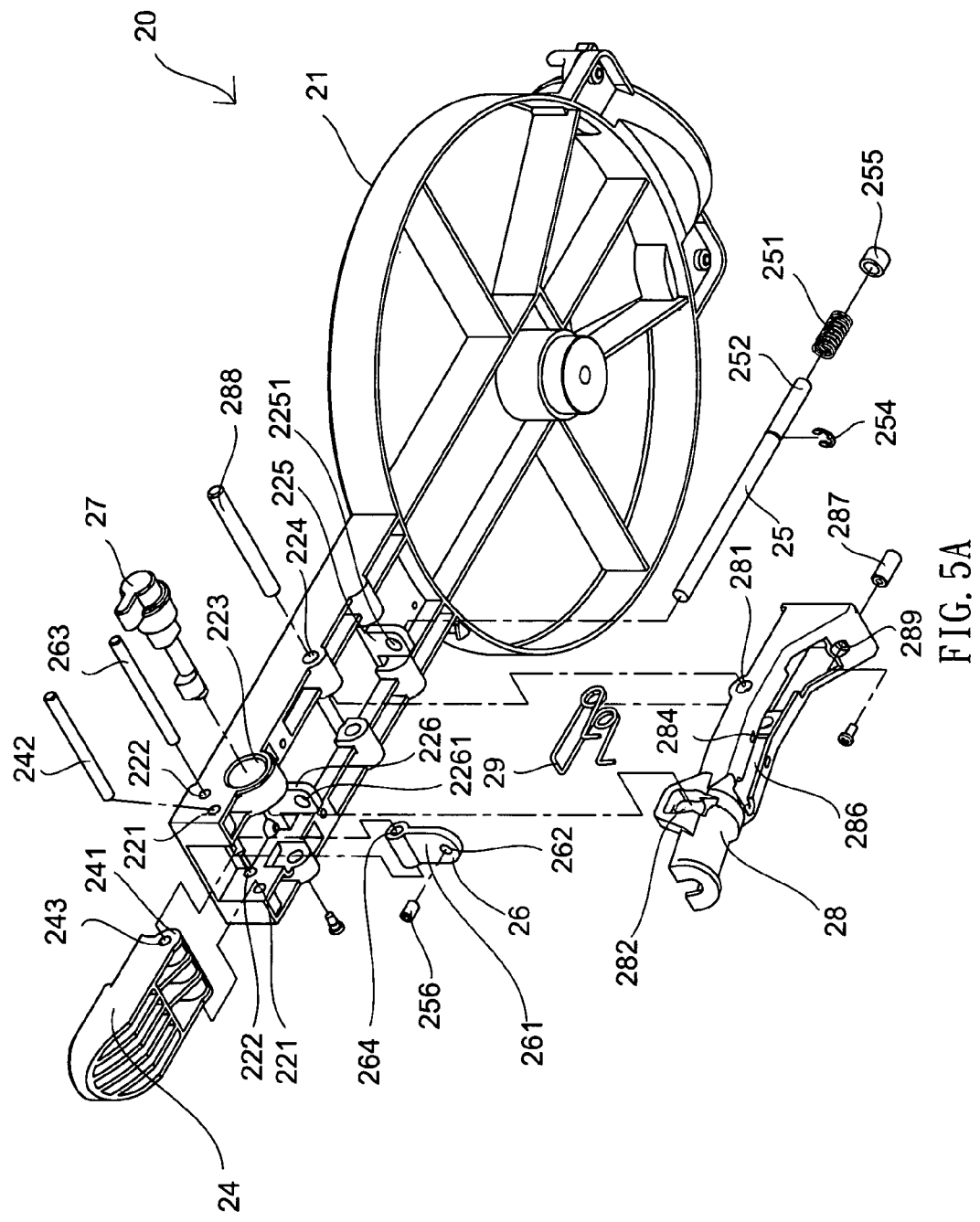
FIG. 5A is an exploded view of FIG. 5.
Figure 5B:
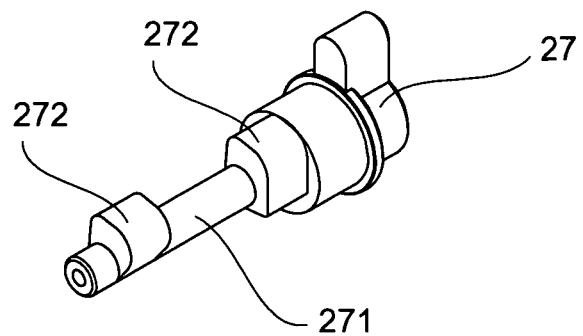
FIG. 5B is a perspective view of the safety.
Figure 5C:
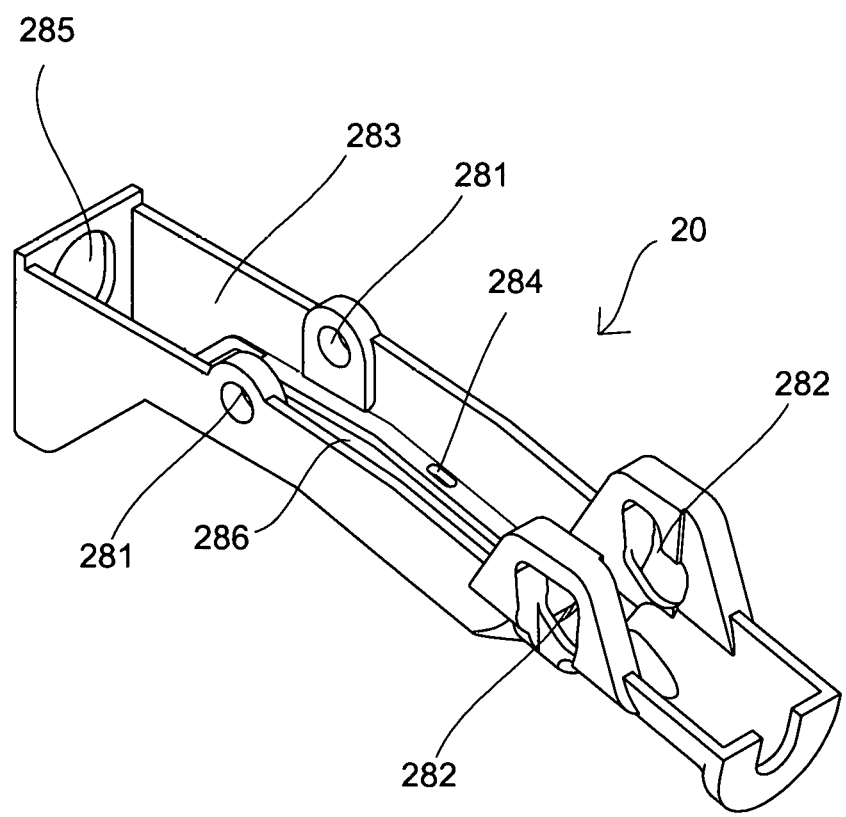
FIG. 5C is a perspective view of the link.

Referring to FIGS. 1 to 8A, a power miter saw 1 in accordance with the invention comprises the following components as discussed in detail below.

A base assembly 10 includes a frame 101, a plurality of cavities 102 on a bottom of the frame 101, two supports 11 at two sides of the frame 101 respectively, two parallel sliding rods 12 passing through one support 11, a space under the frame 101, and the other support 11, and two handle elements 13 at two ends of the sliding rods 12 respectively.

A table assembly 20 includes a rotatable table 21 mounted on the frame 101, a miter arm 22 secured to the table 21, a fence 23 at an edge of the table 21, a lever 24 mounted at one end of the miter arm 22, a linking rod 25, a pivot member 26, a safety device 27, a link 28, and a second spring 29.

The fence 23 includes a central curved top 231, two platforms 233 at two ends of the top 231 respectively, two shoulders 232 each at a joining portion of the top 231 and the adjacent platform 233, and two aligned grooved members 234 each extending outward from a position proximate the platform 233. A number of fasteners (not numbered) are driven through the grooved members 234 into the supports 11 to fasten the fence 23 and the base assembly 10 together.

A saw blade and motor assembly 30 includes an electric motor 31, a rotatable circular saw blade 32 driven by the electric motor 31, a handle 33, a mounting member 34, and a fastener (not numbered) driven through the mounting member 34 into the table 21 to fasten the saw blade and motor assembly 30 and the table assembly 20 together.

A workpiece (e.g., a piece of wood) 40 is placed on a spacer (e.g., a piece of discarded wood) 41 which is placed on the table 21. The spacer 41 is flush with the platforms 233. The workpiece 40 is held against the shoulders 232 of the fence 23 and the platforms 233 of the fence 23 prior to a cutting operation so that an increased length of the workpiece 40 can be cut in a single cutting operation.

The table assembly 20, except its components of the table 21 and the fence 23, is the subject of the invention and will be discussed in detail below.

The miter arm 22 is rectangular and includes a top slot member 220 disposed directly under the saw blade 32, two opposite first holes 221, two opposite second holes 222, a third hole 223, two opposite fourth holes 224, a first positioning member 225 projecting downward, a fifth hole 2251 through the first positioning member 225, a second positioning member 226 projecting downward, and a sixth hole 2261 through second positioning member 226.

The lever 24 includes a first cam 241 at an inner end, a hole member 243 through the cam 241, and a pivot 242 through the first holes 221 and the hole 243 to pivotably fasten the lever 24 and an end of the miter arm 22 together. The pivot member 26 includes an urging plate 261, a seventh hole 262 through the urging plate 261, a hole 264 through the a top of the urging plate 261, and a pivot 263 through the second holes 222 and the hole 264 to pivotably fasten the pivot member 26 and the miter arm 22 together.

The link 28 includes an opening 285 at one end, a groove 283 defined between the opening 285 and the other end, two opposite eighth holes 281 adjacent to the opening 285, a slot 286 through the groove 283, two hole elements 284 at two sides of the slot 286 respectively, two opposite L-shaped holes 282 adjacent to the other end, a through hole 289 under the opening 285, and a locking member 287 fastened in the through hole 289 and having an end releasably positioned in one of the cavities 102. The safety device 27 includes a pivot shaft 271 and two spaced second cams 272 formed on the pivot shaft 271. The safety device 27 is pivotably mounted through the third hole 223 and the L-shaped holes 282 and has a pivotal end exposed. A pivot 288 is driven through the fourth holes 224 and the eighth holes 281. As a result, the link 28 is pivotably mounted on an underside of the miter arm 22.

The second spring 29 has a top urging against the underside of the miter arm 22 and two ends anchored in the hole elements 284. The linking rod 25 is inserted through the seventh hole 262, a space under the pivot shaft 271, the sixth hole 2261, and the fifth hole 2251 to have its rear end 252 disposed into a cylindrical retaining member 255 slidably disposed in the opening 285 and the linking rod 25 is disposed across the slot 286. The retaining member 255 is adjacent to the frame 101 and further urges against the first positioning member 225 in the groove 283. The linking rod 25 includes a C-ring 254 adjacent to the rear end 252, a first spring 251 biased between the C-ring 254 and the first positioning member 225, and a retaining element 256 anchored in the seventh hole 262 and urging against a front end 253. The second cams 272 are pivotably disposed in the L-shaped holes 282 respectively.

Figure 6:
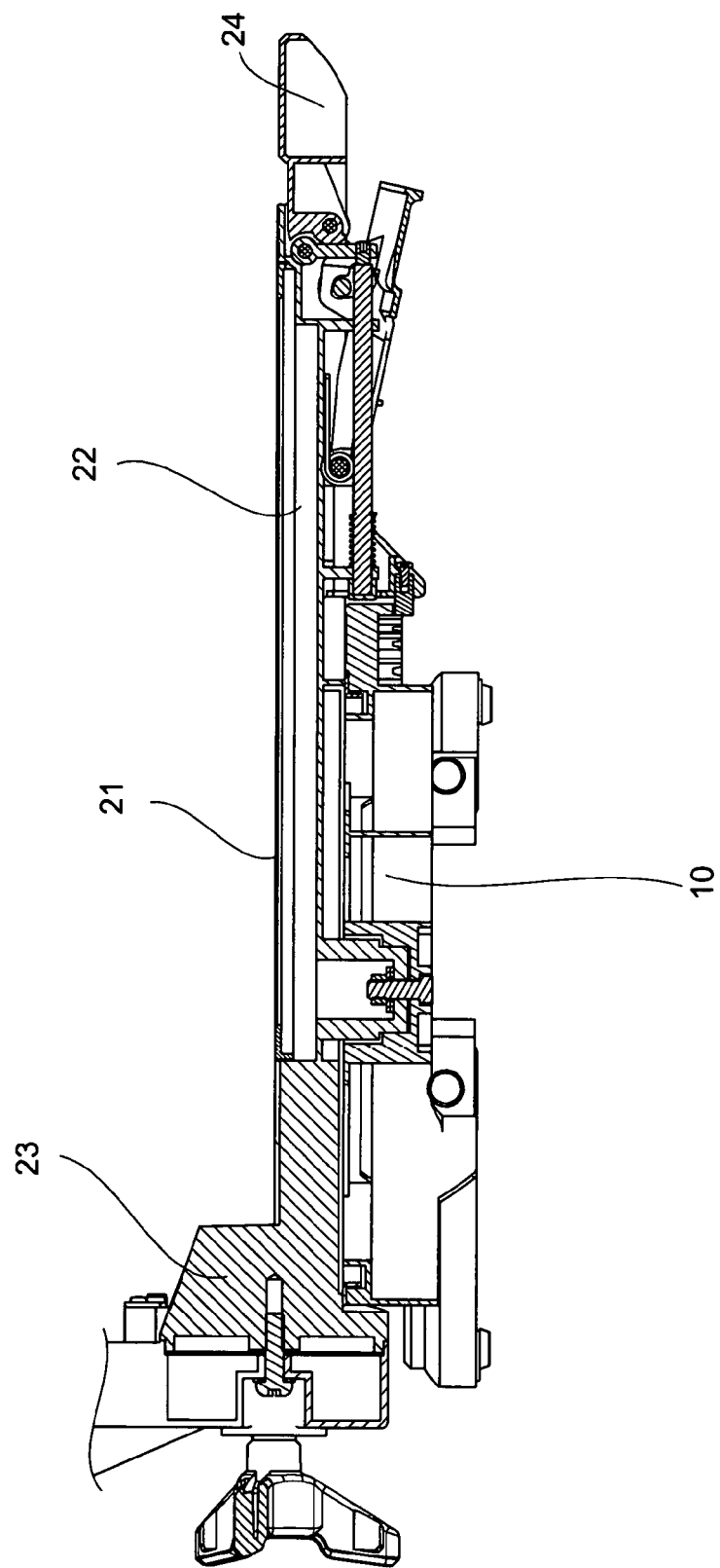
FIG. 6 is a longitudinal sectional view of the table assembly showing the miter arm being locked when the safety has been pivoted to a first position.
Figure 6A:
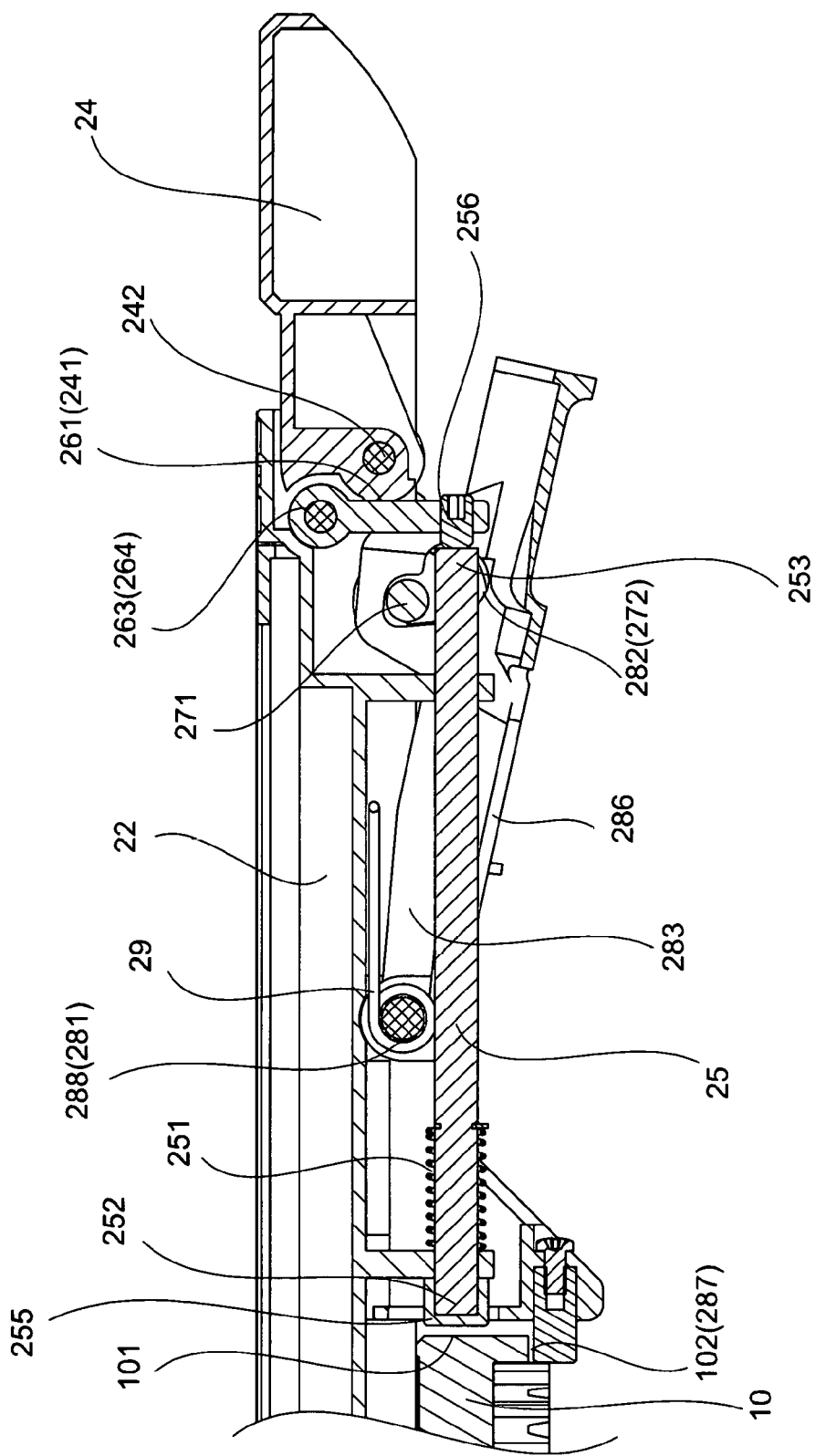
FIG. 6A is an enlarged view of the right portion of FIG. 6.

As shown in FIGS. 6 and 6A specifically, the miter arm 22 is held in place when the safety device 27 has been pivoted to a first position.

Figure 7:
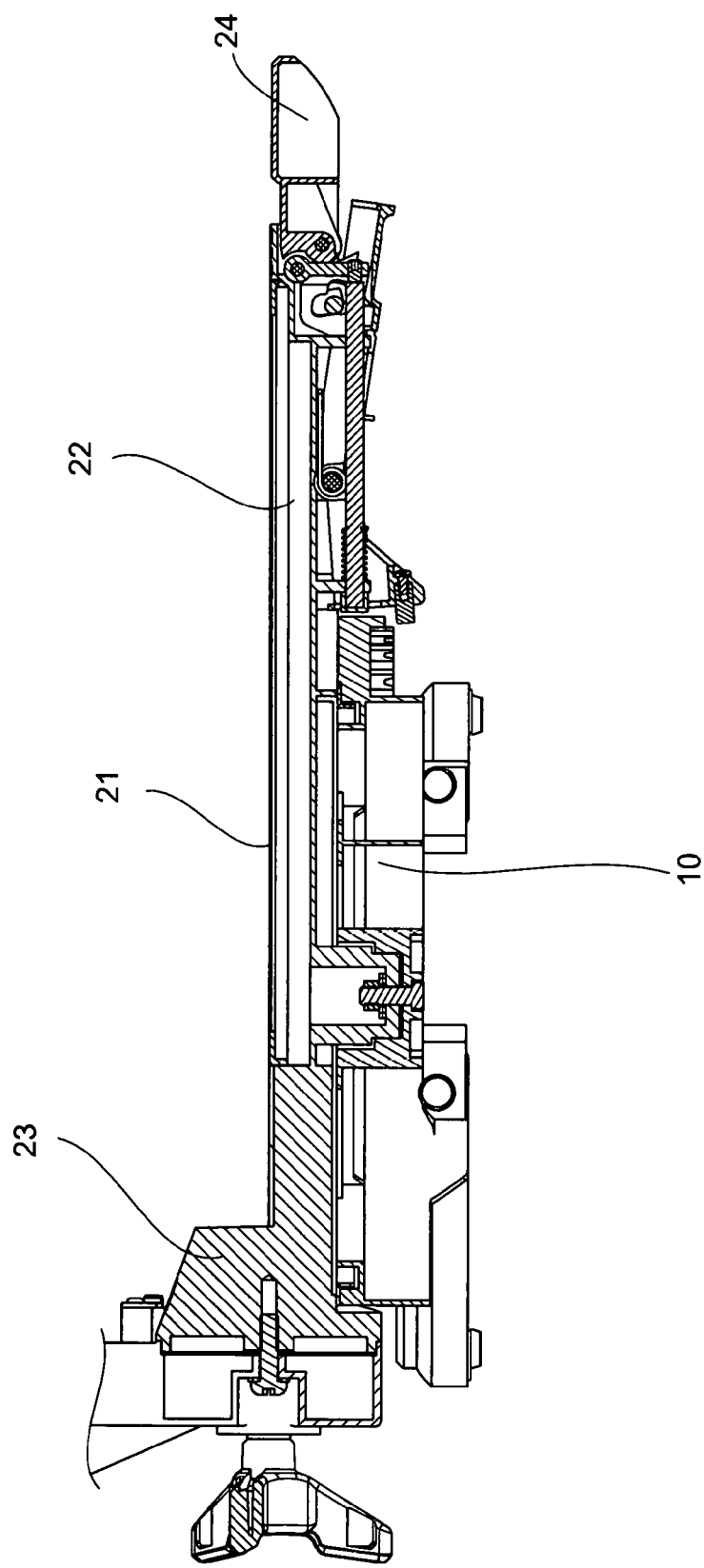
FIG. 7 is a view similar to FIG. 6 showing the second cam being urged against an inner surface of a ninth hole, the link moving upward to compress the second spring, and the locking member clearing the cavity, and the miter arm being unlocked when the safety has been pivoted to a second position.
Figure 7A:
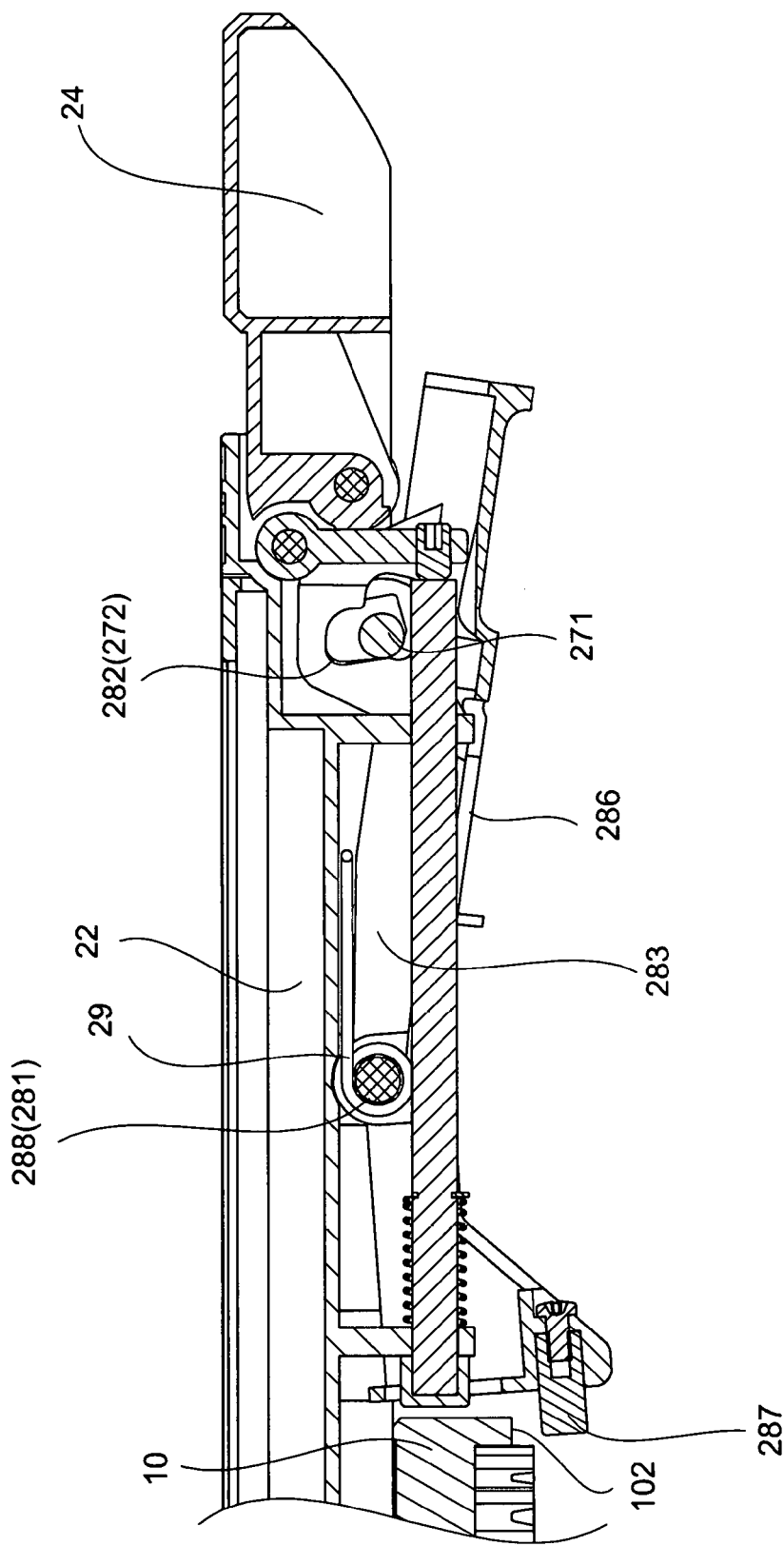
FIG. 7A is an enlarged view of the right portion of FIG. 7.

As shown in FIGS. 7 and 7A specifically, after pivoting the safety device 27 to a second position, the second cams 272 urge against inner surfaces of the L-shaped holes 282, the link 282 moves upward to compress the second spring 29, and the locking member 287 moves downward to clear the cavity 102, and the miter arm 22 is free.

Figure 8:
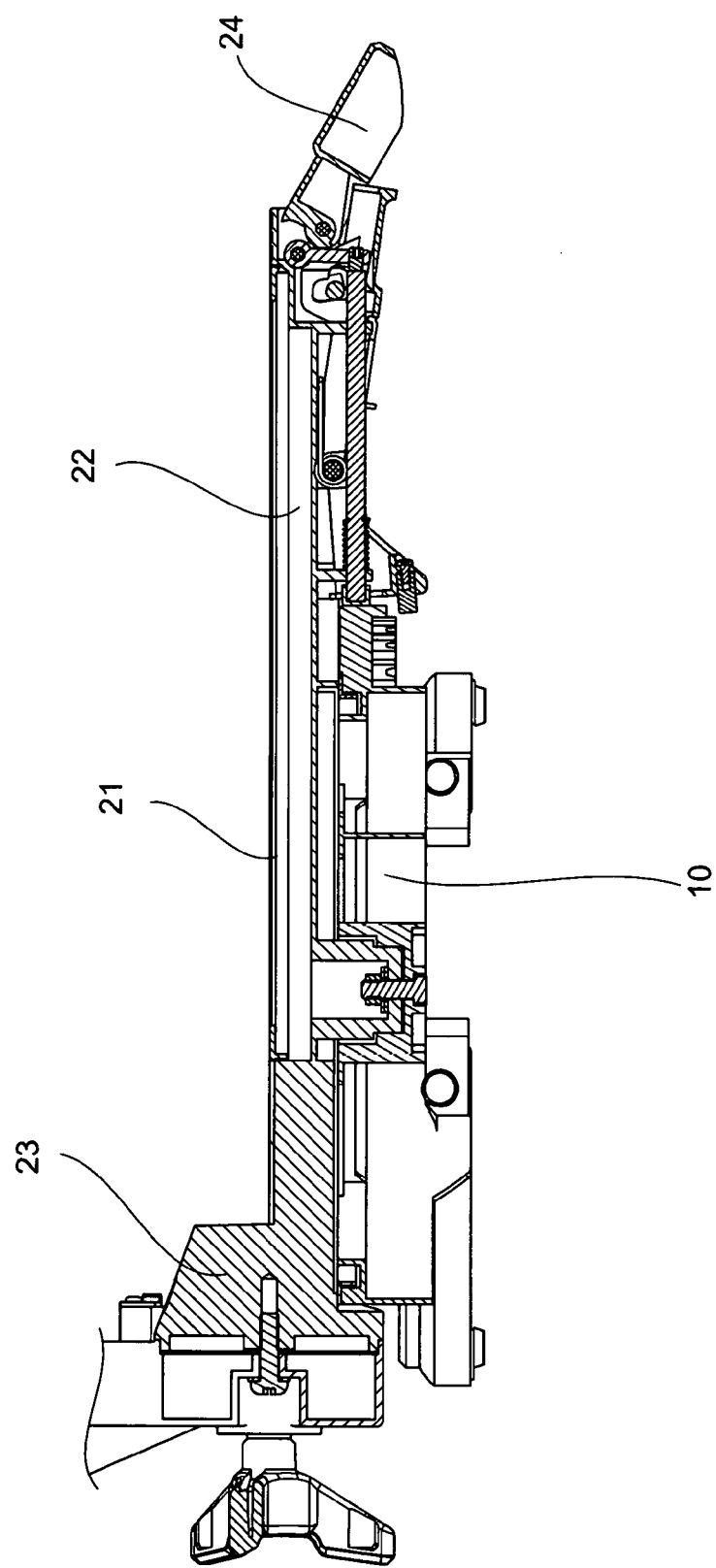
FIG. 8 is a view similar to FIG. 6 showing the lever being pivoted downward, the first cam urging against the urging plate to move the linking rod, the first spring being compressed, and the rear end urging against the frame, thereby locking the miter arm.
Figure 8A:
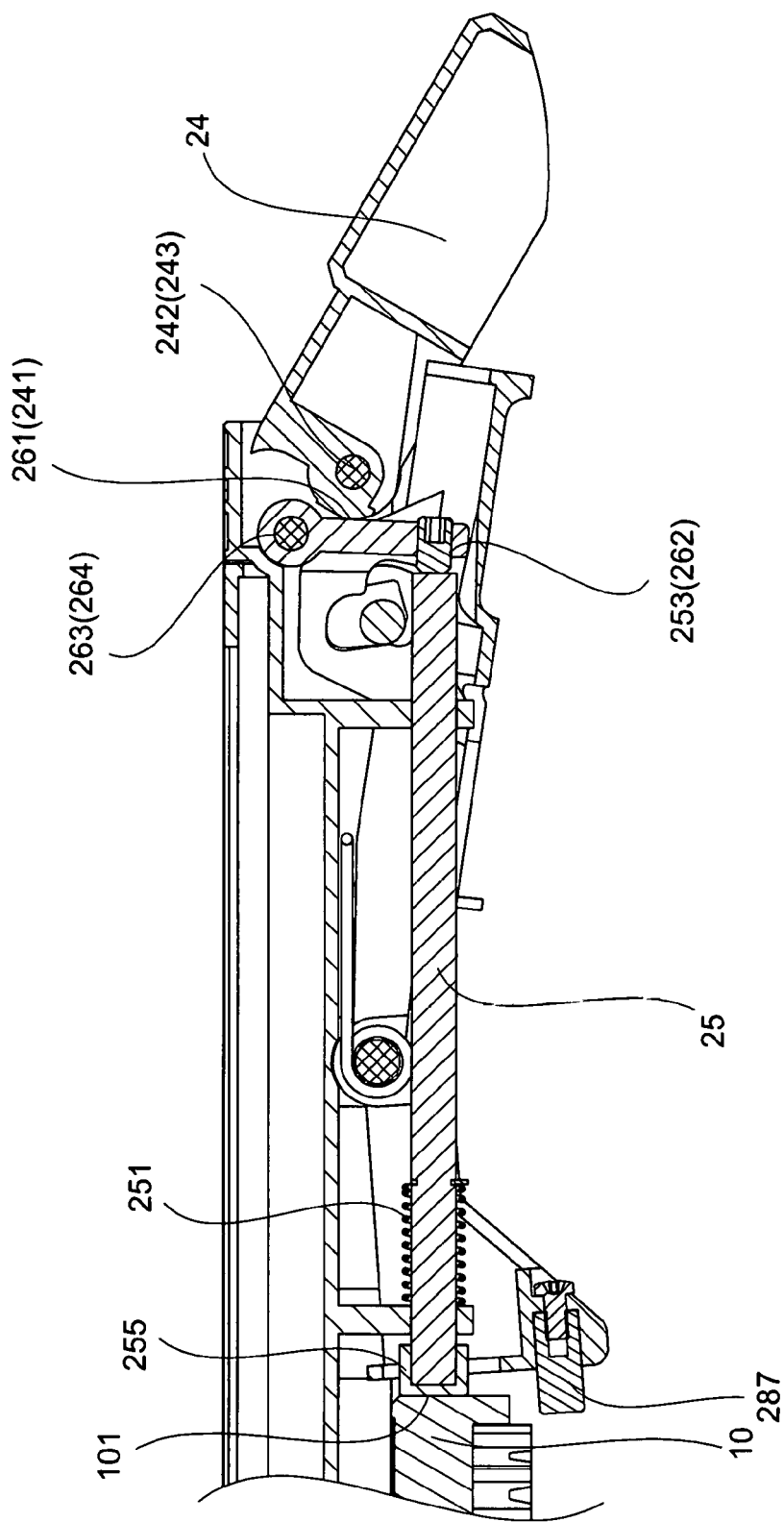
FIG. 8A is an enlarged view of the right portion of FIG. 8.

As shown in FIGS. 8 and 8A specifically, after pivoting the lever 24 downward, the first cam 241 urges against the urging plate 261 to move the linking rod 25 inward, the first spring 251 is compressed, and the retaining member 255 urges against the frame 101, thereby locking the miter arm 22.

While the invention has been described in terms of preferred embodiments, those skilled in the art will recognize that the invention can be practiced with modifications within the spirit and scope of the appended claims.

What is claimed is:
1. A power miter saw comprising:
a base assembly including a frame, a plurality of cavities on a bottom of the frame, two supports at two sides of the frame respectively, and two parallel sliding rods passing through one support;
a table assembly including a rotatable table mounted on the frame, a miter arm secured to the rotatable table, and a fence at an edge of the rotatable table and secured to the supports; and
a saw blade and motor assembly including an electric motor, a rotatable circular saw blade driven by the electric motor, a handle, and a mounting member secured to the rotatable table;
wherein the fence includes a central curved top, two platforms at two ends of the central curved top respectively, two shoulders each at a joining portion of the central curved top and the adjacent platform, and two aligned grooved members each extending outward from a position proximate the platform;
wherein the platforms are at an elevation greater than that of the miter arm;
wherein the miter arm is rectangular and includes a first positioning member projecting downward, a second positioning member projecting downward, and a pivot member pivotably secured to a rear end of the miter arm and having an urging plate;
wherein the table assembly further includes:
a lever pivotably secured to a rear end of the miter arm and including a first cam urging against the urging plate;
a spring biased link pivotably secured to a bottom of the miter arm and including an opening at a rear end, a groove defined between the opening and a front end, a slot through the groove, two opposite L-shaped holes adjacent to the front end, and a locking member disposed in the rear end under the opening;
a safety device pivotably mounted through the L-shaped holes and including two spaced second cams urging against inner surfaced of the L-shaped holes respectively, wherein the safety device is pivotably secured to the rear end of the miter arm; and
a spring biased linking rod including a rear retaining member slidably disposed in the opening, being adjacent to the frame, and urging against the first positioning member, and a retaining element anchored in the urging plate and urging against a front end of the linking rod;
wherein the locking member has an end releasably positioned in one of the cavities in a first position of the safety device with the miter arm being held in place;
wherein in response to pivoting the safety device to a second position, the link moves upward, and the locking member moves downward to clear the cavity, thereby unlocking the miter arm; and
wherein in response to pivoting the lever downward, the linking rod moves inward, and the retaining member urges against the frame, thereby locking the miter arm.

2. The power miter saw of claim 1, wherein the linking rod further includes a C-ring adjacent to the rear end, and a first spring biased between the C-ring and the first positioning member.

3. The power miter saw of claim 1, wherein the link further includes two hole elements at two sides of the slot respectively, and a second spring having a top urging against the underside of the miter arm and two ends anchored in the hole elements respectively.

4. The power miter saw of claim 1, wherein the miter arm further includes two opposite first holes, two opposite second holes, a third hole, two opposite fourth holes, a fifth hole through the first positioning member, a second positioning member projecting downward, and a sixth hole through second positioning member.

5. The power miter saw of claim 4, wherein the lever further includes a hole member through the cam, and a pivot through the first holes and the hole to pivotably fasten the lever and an end of the miter arm together.

6. The power miter saw of claim 4, wherein the pivot member further includes a seventh hole through the urging plate, a hole through the a top of the urging plate, and a pivot through the second holes and the hole to pivotably fasten the pivot member and the miter arm together.

7. The power miter saw of claim 4, wherein the link further includes two opposite eighth holes adjacent to the opening, and a pivot driven through the fourth holes and the eighth holes so that the link is pivotably mounted on an underside of the miter arm.

8. The power miter saw of claim 6, wherein the linking rod is inserted through the seventh hole, the sixth hole, and the fifth hole to have its rear end disposed into the retaining member slidably disposed in the opening, and wherein the linking rod is disposed across the slot.

9. The power miter saw of claim 4, wherein the safety device is pivotably mounted through the third hole and the L-shaped holes, and has a pivotal end exposed.

* * * * *